United States Patent [19]
Takemoto et al.

[11] Patent Number: 5,459,997
[45] Date of Patent: Oct. 24, 1995

[54] ENGINE EXHAUST GAS PURIFICATION SYSTEM

[75] Inventors: Takashi Takemoto, Higashihiroshima; Hideharu Iwakuni, Hiroshima; Motoshi Kataoka, Hiroshima; Kazuhiro Furukawa, Hiroshima, all of Japan

[73] Assignee: Mazda Motor Corporation, Hiroshima, Japan

[21] Appl. No.: 215,766

[22] Filed: Mar. 22, 1994

[30] Foreign Application Priority Data

Mar. 31, 1993 [JP] Japan .................... 5-096583

[51] Int. Cl.$^6$ .......................................... F01N 3/22
[52] U.S. Cl. ................... 60/276; 60/277; 60/285; 60/289
[58] Field of Search .................. 60/276, 277, 289, 60/285

[56] References Cited

FOREIGN PATENT DOCUMENTS 3-225013  10/1991  Japan.

Primary Examiner—Douglas Hart
Attorney, Agent, or Firm—Keck, Mahin & Cate

[57] ABSTRACT

An exhaust gas purification system having a catalyst for removing nitrogen oxides from exhaust gas causes the temperature range of activation of the catalyst to shift toward the higher temperature side when the degree of oxidation of the catalyst becomes pronounced.

6 Claims, 3 Drawing Sheets

ENGINE EXHAUST GAS PURIFICATION SYSTEM

BACKGROUND OF THE INVENTION

1. Field of the Invention

The present invention relates to an exhaust gas purifying system for an automobile engine.

2. Description of Related Art

Typically, some of automobile engine exhaust gas purification systems are provided with a catalytic converter for purifying nitrogen oxides in an exhaust system, in which the catalytic converter can remove nitrogen oxides (NOx) as well as hydrocarbons (HC) and carbon monoxide (CO) even when the engine is running with a lean air-fuel ratio. Such an exhaust gas purification system is known from, for instance, Japanese Unexamined Patent Publication No. 3-225013.

However, the inventors of this invention found that an exhaust gas purification system of this kind shows a phenomenon that the temperature range of catalyst activation shifts toward a lower side with passage of time under lean actual operating conditions, i.e. when the engine is running with a lean air-fuel ratio. Hence, if this phenomenon is ignored, the performance of the catalyst drops with passage of time because the air-fuel ratio is set to optimize the temperature of exhaust gas at the entrance of the catalytic converter in consideration of the initial temperature range of catalyst activation.

SUMMARY OF THE INVENTION

It is an object of the present invention to provide an exhaust gas purification system for an engine that prevents the nitrogen oxide purification performance of catalyst from falling or deteriorating because of changes in characteristics due to aging.

The foregoing object of the present invention is accomplished by providing an engine exhaust gas purification system equipped with a catalyst for removing nitrogen oxides in an engine exhaust system and a deoxidized condition detecting means, such as an oxygen ($O_2$) sensor, for detecting the concentration of oxygen ($O_2$) for the degree to which the catalyst is deoxidized. The system further has a temperature range shift means for shifting a temperature range of activation of the catalyst toward a higher side and a control means for controlling the temperature range shift means so as to shift the temperature range of activation of the catalyst toward a higher side more as the degree of oxidation becomes more pronounced.

With the exhaust gas purification system of the present invention, the temperature range of activation of the catalyst is shifted to a higher temperature side as the deoxidized or reduced condition of the catalyst becomes more pronounced. Therefore, the phenomenon that the temperature range of activation of the catalyst shifts a lower temperature because of changes due to aging or time-dependent characteristics is returned to the original condition that the catalyst has when it is still fresh, and the nitrogen oxide purification performance is kept from dropping off with changes due to aging or with passage of time.

BRIEF DESCRIPTION OF THE DRAWINGS

The above and other objects and features of the present invention will be clearly understood from the following description with respect to a preferred embodiment thereof when considered in conjunction with the accompanying drawings, in which.

DETAILED DESCRIPTION OF THE PREFERRED EMBODIMENT

Figure 1:
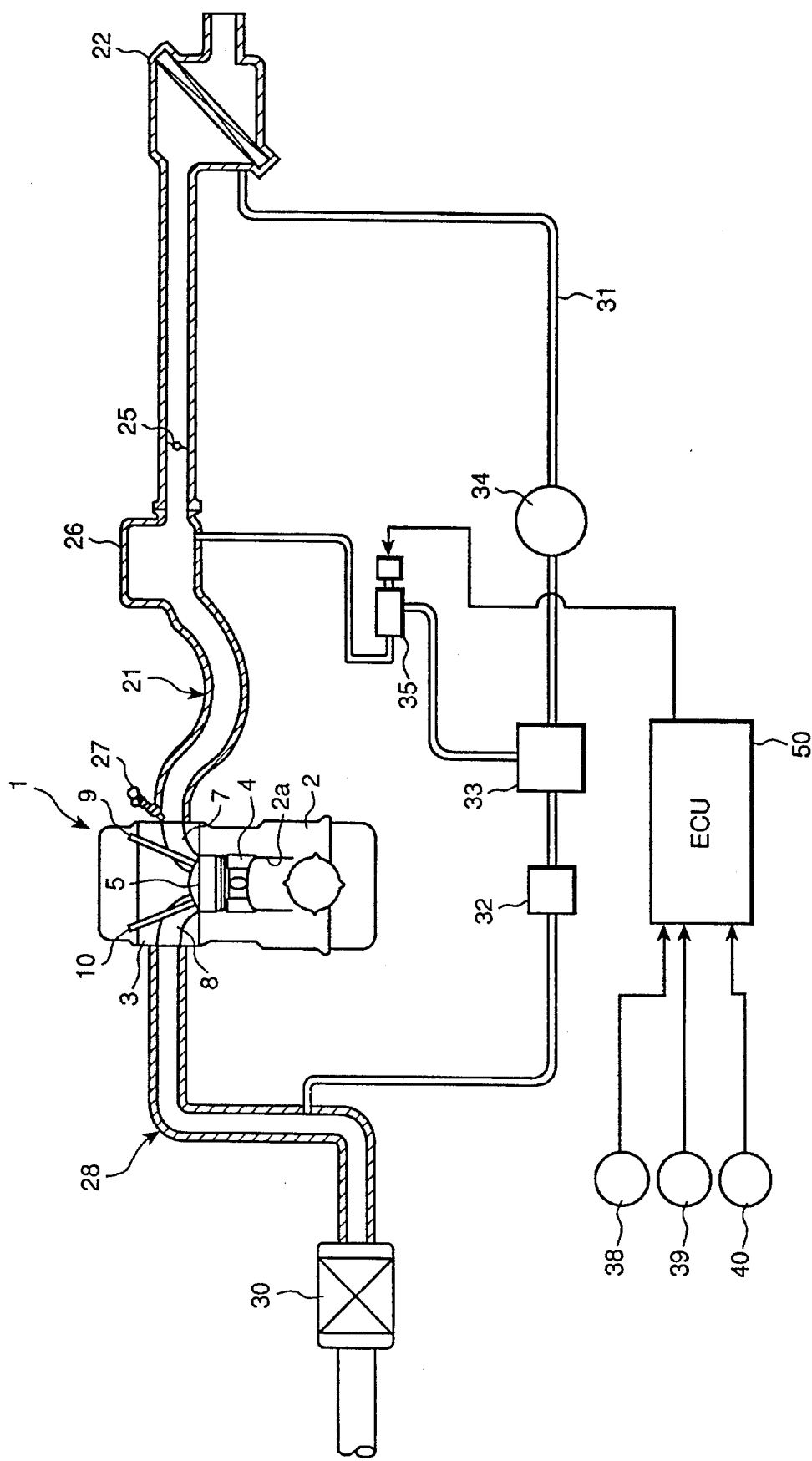
FIG. 1 is a schematic view showing an internal combustion engine equipped with an exhaust gas purification system in accordance with a preferred embodiment of the present invention.

Referring to the drawing in detail, and, in particular, to FIG. 1, an Otto type of four-cycle reciprocating lean burn engine 1 of an automobile equipped with an exhaust gas purification system in accordance with a preferred embodiment of the present invention is schematically shown. This engine 1 has a combustion chamber 5, which is defined in the common manner by a cylinder block 2, a cylinder head 3 and a piston 4 in a cylinder 2a, and intake and exhaust ports 7 and 8 both opening into the combustion chamber 5. These intake and exhaust ports 7 and 8 are opened and closed at an appropriate timing by the intake and exhaust valves 9 and 10, respectively. The intake port 7 is connected to an intake line 21, which is provided in order from the upstream side with an air cleaner 22, a throttle valve 25 and a fuel injection valve 27. The exhaust port 8 is connected to an exhaust line 28 provided with a catalytic converter 30 for removing nitrogen oxides (NOx), which is hereafter referred to as a nitrogen oxide catalytic converter for simplicity. The nitrogen oxide catalytic converter 30 uses, for instance, a precious metal zeolite catalyst composed of metal zeolite with precious metals such as platinum, iridium and the like. Further, the nitrogen oxide catalytic converter 30 has the capability of removing nitrogen oxides (NOx) along with hydrocarbons (HC) and carbon monoxide (CO) even during periods of high oxygen concentrations caused by the engine running with air-fuel ratios in the range of lean burning.

The intake line 21 and the exhaust line 28 are communicated with each other by an air line 31, one end of which is connected to the exhaust line 28 before the nitrogen oxygen catalytic converter 30 and the other end of which is connected to the intake line 21 between the air cleaner 22 and the throttle valve 25. The air line 31 is provided, in order from the exhaust line 28 to the intake line 21, with a check valve 32, an air control valve 33 (which is hereafter referred to as an ACV for simplicity), and an air pump 34. The check valve 32, which is of an ordinary type, permits the flow of air only in the direction from the air pump 34 toward the exhaust line 28. A negative pressure activated valve, which is well known to those skilled in the art, is used for the ACV 33. This ACV 33 cooperates with a three-way electromagnetic valve 35 so as to open and close with the negative pressure of intake air or the atmospheric pressure applied thereto through the three-way electromagnetic valve 35. The air pump 34 is linked to the engine 1 so as to be is driven by drive power from the engine 1.

An electronic control unit (ECU) 50, which is composed of a microcomputer and controls various electronic components, receives various signals from sensors 38, 39 and 40. The speed sensor 38 detects the rotational speed of the engine 1; the linear type of oxygen ($O_2$) sensor 39 detects the concentration of oxygen ($O_2$) in exhaust gas after the nitrogen oxide catalyst 30 to judge the deoxidation or reduction state of nitrogen oxides (NOx); and the temperature sensor 40 detects the temperature of exhaust gas at the entrance of the nitrogen oxide catalytic converter 30.

Figure 2:
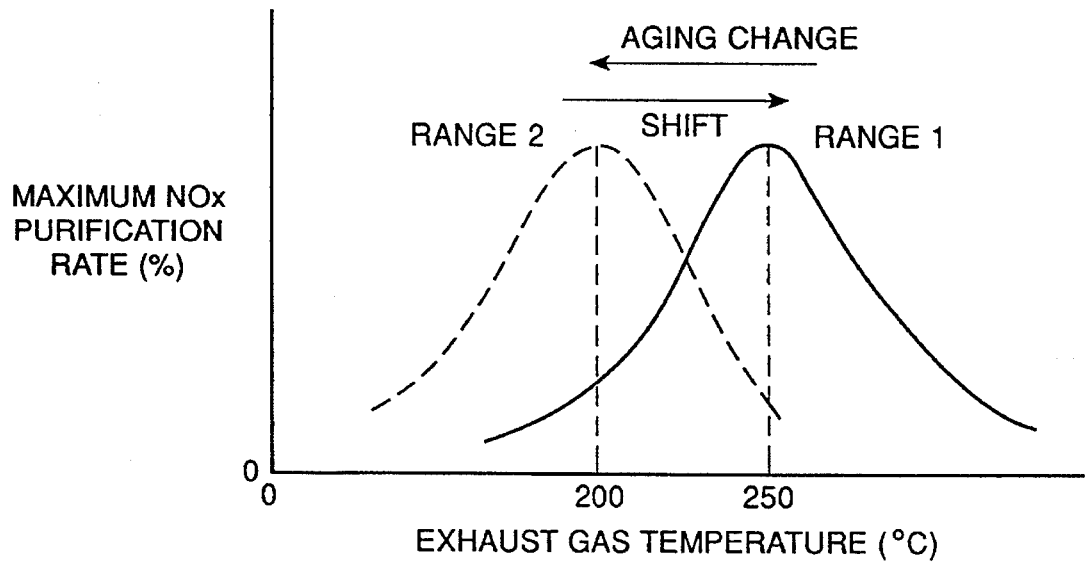
FIG. 2 is a graph showing changes in activation temperature range.
Figure 3:
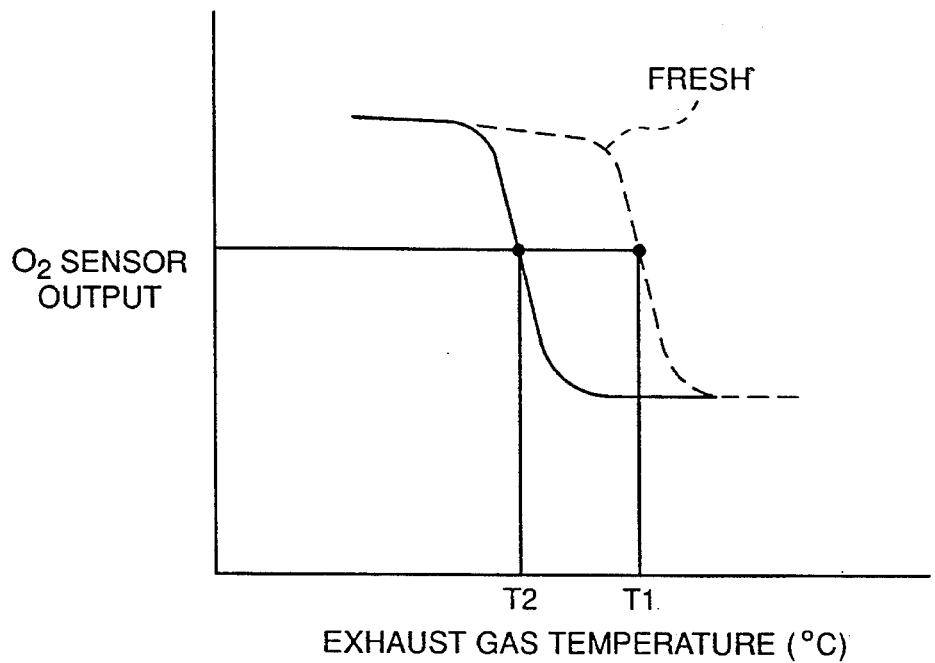
FIG. 3 is a graph showing changes in deoxidized condition of a catalyst with respect to exhaust gas temperature.

Before describing the functions of the control unit 50, reference is made to FIGS. 2 and 3 for the purpose of providing aging or time-dependent characteristics of the nitrogen oxide catalyst as determined by the inventors of this invention which will enhance an understanding of the operation of the control unit 50.

As was previously described, one of the aging or time-dependent characteristics is that when the engine is running with air-fuel ratios on a lean side, the temperature range of activation of the nitrogen oxide catalyst 30 which, as shown in FIG. 2, shifts from a fresh range indicated by a reference numeral 1 which is provided when the nitrogen oxide catalyst 30 is fresh to a deteriorated range indicated by a reference numeral 2 which is provided with passage of time, i.e. the nitrogen oxide catalyst 30 has a tendency to shift the temperature range of activation toward a lower temperature side. Hence, when the optimal temperature of exhaust gas at the entrance of the nitrogen oxide catalyst 30 is established within the temperature range 1 of activation, which is, for instance, 250° C., the purification rate of nitrogen oxides (NOx) falls as the temperature range of activation shifts to the range 2. The reason for this is thought to be that the nitrogen oxide catalyst 30 generally has a hydrocarbon absorption power, as a general characteristic of zeolite and the like, and as a result of hydrocarbons being absorbed by the nitrogen oxide catalyst 30 by means of physical absorption or weak chemical absorption, those hydrocarbons act on catalyst components and, further, enhances the tendency to absorb oxygen from nitrogen oxides, and, in addition, causes the consumption of oxygen on the nitrogen oxide catalyst 30.

In other words, even if the engine 1 is running with air-fuel ratios on the lean side, the concentration of oxygen in exhaust gas is at most 7 to 8% and, on the other hand, the exhaust gas contains deoxidized gases such as hydrogen, carbon monoxide and hydrocarbons. Accordingly, it is thought that the oxygen present in the catalyst (the oxygen stabilized on the catalyst during calcination processes and the like) is used when these deoxidized gases are removed through oxidation at the active sites of the catalyst. Because of this, the surface of the catalyst is thought to be deoxidized or reduced, so that the temperature range of activation of the catalyst shifts toward the lower temperature side, which is the reversed phenomenon of so-called atmospheric aging.

From the above discussion based on the basis of experimental results, the exhaust gas purification system of the present invention compensates to refresh the catalyst and to maintain in the temperature range 1 even when the temperature range of activation of the nitrogen oxide catalyst 30 tends to shift from the temperature range 1 to the temperature range 2, thereby preventing a decline in nitrogen oxide purification performance caused by changes in aging or time-dependent characteristics.

Specifically, in consideration of the dependency of the shift of the temperature range of activation of nitrogen oxide catalyst upon the deoxidized or reduced state of the surface of the nitrogen oxide catalyst, with the exhaust gas purification system of the present invention, as is clear from FIG. 3, it is detected the degree to which the temperature of catalyst T2 has dropped with respect to the temperature of catalyst T1 when the catalyst is fresh under conditions in which the deoxidized or reduced state, i.e. the concentration of oxygen, on the surface of the catalyst 14 is unchanged. When the difference between the two temperatures T1 and T2 exceeds a specific value To, secondary air is supplied to the catalyst 14 so as to oxidize the catalyst or burn hydrocarbons, thereby creating a catalytic condition the same as or similar to the catalytic condition resulting from atmospheric aging. In other words, in an attempt to counteract catalyst deterioration of activity, an oxidized condition of the catalyst is created so as to promote sintering and the production of oxides, thereby shifting the temperature range of activation of the catalyst 30 to the higher side, or refreshing the catalyst and restoring it to its original activation operating temperature T1.

Figure 4:
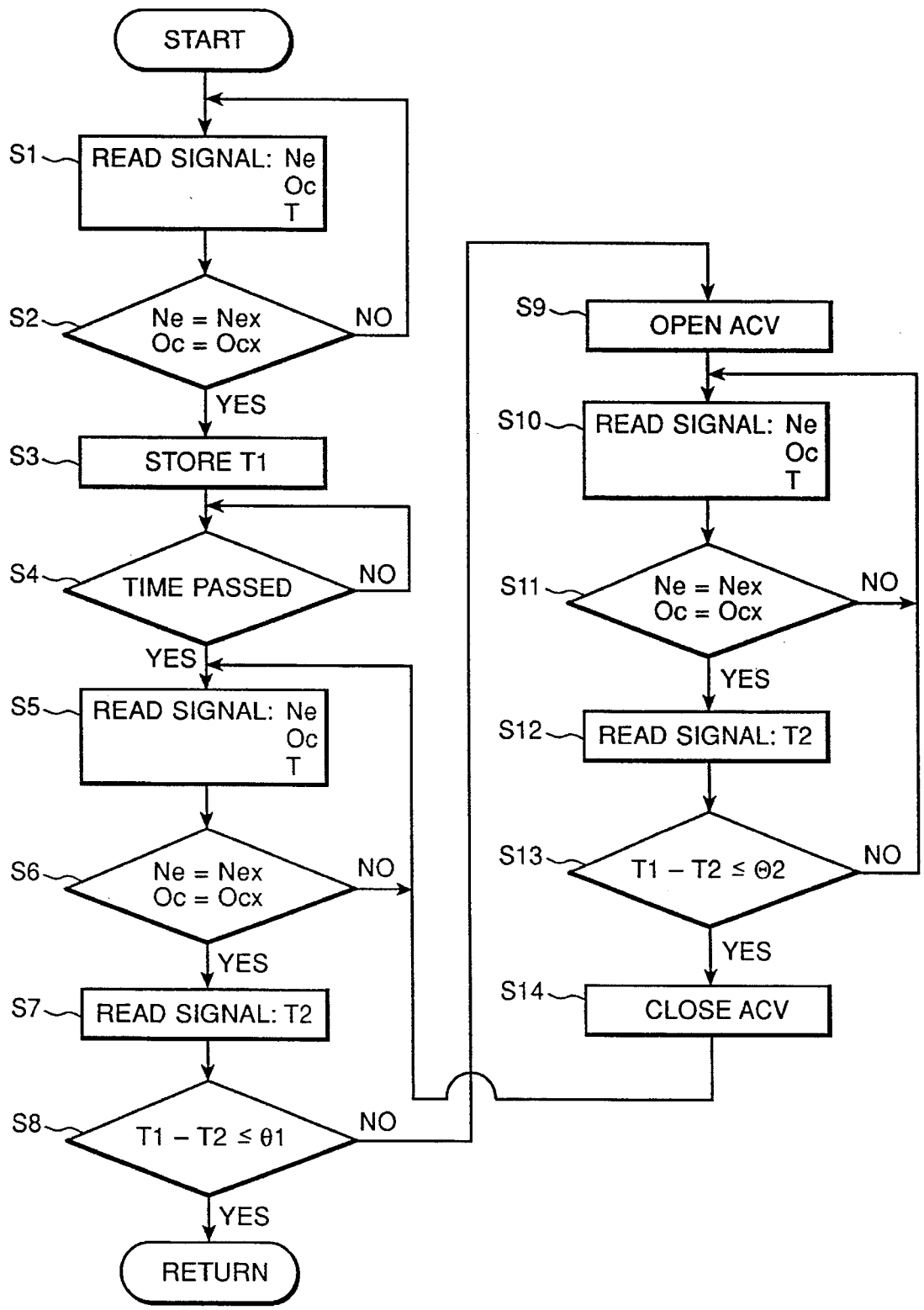
FIG. 4 is a flow chart illustrating a temperature range shift control sequential routine for a microcomputer.

The operation of the exhaust gas purification system depicted in FIG. 1 will be best understood by reviewing FIG. 4, which is a flow chart illustrating a sequential routine for the microcomputer of the control unit 50. Programming a computer is a skill well understood in the art. The following description is written to enable a programmer having ordinary skill in the art to prepare an appropriate program for the microcomputer. The particular details of any such program would of course depend upon the architecture of the particular computer selected.

Referring to FIG. 4, which is a flow chart of the temperature range shift control sequential routine for the microcomputer of the control unit 50, the first step at step S1 is to read signals representative of an engine speed Ne from the speed sensor 38, an oxygen concentration Oc in the exhaust gas after the nitrogen oxide catalyst 30, and an exhaust gas temperature T at the entrance of the nitrogen oxide catalytic converter 30 from the temperature sensor 40, respectively. Reading of these signals is done when the catalyst 30 is still fresh. Subsequently, a decision is made at step S2 as to whether or not the engine speed Ne and the oxygen concentration Oc are equal to a specific engine speed Nex, for instance 2,000 rpm, and a specific oxygen concentration Ocx, for instance corresponding to an air-fuel ratio A/F of 20, respectively. This decision is made in order to determine the temperature of the exhaust gas at the entrance of the catalyst 30 under the specific engine speed Nex and the specific oxygen concentration Ocx. When the answer to the decision is "NO," the routine returns to step S1. When the answer to the decision is "YES," then at step S3, the temperature of exhaust gas T is recorded as a temperature T1 for the specific engine speed Nex and the specific oxygen concentration Ocx under the fresh condition of the catalyst 30.

At step S4, a decision is made as to whether a certain time period, for instance 30 minutes, has elapsed from the initiation of use of the catalyst 30, i.e. as to whether or not it is necessary to take into consideration changes in time-dependent or aging characteristics of the catalyst 14. If the answer to the decision made at step S4 is "NO," another decision at step S4 is repeated until the "YES" answer is provided. When the answer to the decision made at step S4 is "YES," then after reading a current, engine speed Ne and a current oxygen concentration Oc at step S5, a decision is made at step S6 as to whether or not the current engine speed Ne and the current oxygen concentration Oc are equal to the specific engine speed Nex and the specific oxygen concentration Ocx, respectively. This decision is the same as was made in step S2 and, however, used to unify the conditions other than the temperature of exhaust gas at the entrance of the catalyst as the object of comparison, as a prerequisite for determining whether or not the temperature range of activation of the catalyst 30 has shifted to the lower temperature side. Accordingly, if the answer to the decision made at step S6 is "NO," the routine returns to step S5. When the answer to the decision made at step S6 is "YES," then a current temperature of exhaust gas T2 is read at step S7.

Subsequently, a decision is made at step S8 as to whether or not the difference between the temperatures T1 and T2 read at step S4 and step S7, respectively is smaller than a specific $\Theta1$, for instance 30° C. This step is made to determine whether or not it is necessary to perform a correction with respect to some change in aging of time-dependent characteristics of the catalyst 14. If the answer to the decision is "YES," this indicates that any correction is unnecessary, then, the routine orders return. When the answer to the decision made at step S8 is "NO", the correction is conducted at step S9 by supplying secondary air to the catalyst 30. For this, the air control valve (ACV) 33 is opened. Thus, the surface of the catalyst 30 is oxidized by the air as described above, the temperature range of activation is shifted toward the higher temperature side, so that the catalyst 30 restores the temperature range of activation which it showed when it was still fresh.

During the supply of secondary air, steps from S10 to S13, which are the same processes as performed through steps S5 to S8, take place. However, only the exception is another specific value $\Theta2$ referred at step S13 is established to be smaller than the specific value $\Theta1$, which is 30° C., at step S8. The supply of secondary air is continued as long as the correction is necessary. When it is determined at step S13 that the correction is not necessary, the air control valve (ACV) 33 is closed to terminate the supply of secondary air at step S14. The last step orders return to step S5.

In order to substantiate the purification performance of the exhaust gas purification system, a comparative experiment was made between the exhaust gas purification system of the invention (Model I and II) and a comparable exhaust gas purification system without being equipped with any corrective air supply feature (Comparable Model). In this instance, the comparative experiment was performed with an air-fuel ratio of 14.7 to 22 in an exhaust gas and fuel consumption test mode 10.15 in Japanese standard (which is called a revised mode 10). The result is shown in Table I below.

TABLE I

| | Mode Total NOx Purification Rate (%) | |
|---|---|---|
| | Fresh | After 50 hours of aging at 800° C. |
| Comparable model | 50.7% | 32% |
| Model I $\Theta1 = 30°$ C. | 52.2% | 45.2% |
| Model II $\Theta1 = 20°$ C. | 52.2% | 47% |

In this Table I, the experimental condition "after 50 hours of aging at 800° C." refers that an engine to which the catalyst is connected is operated for 50 hours keeping the temperature of exhaust gas immediately before the catalyst at 800° C.

The result shows that the models I and II of the exhaust gas purification system of the invention have higher nitrogen oxide purification rates than the comparable model and that the nitrogen oxide purification rate becomes larger with a decrease in the preset decision value of temperature differences, T1−T2$\leq \Theta1(\Theta2)$.

It is to be understood that although supplying of secondary air has been used as a corrective shift means for the catalyst 30, it may be done to control the fuel injection valve 12 so as to cut the supply of fuel to some of the cylinders. This also conducts the result of shifting of the temperature range of activation of the catalyst 30 to the higher temperature side as is achieved with the supply of secondary air. Specifically, in the flow chart illustrated in FIG. 4, in place of opening the air control valve (ACV) 33 at step S9, the control unit 50 interrupts fuel injection pulses to some fuel injection valves 27 so as to cut fuel supply to the corresponding cylinders, and in place of closing the air control valve (ACV) 33 at step S14, the control unit 50 resumes fuel injection pulses to these fuel injection valves 27 so as to terminate the cutting-off of fuel.

It is also to be understood that although the present invention has been described in detail with respect to a preferred embodiment of the invention, various other embodiments and variants may occur to those skilled in the art, which fall within the scope and spirit of the invention. Such other embodiments and variants are intended to be covered by the following claims:

What is claimed is:

1. An exhaust gas purification system having a catalyst for removing nitrogen oxides in exhaust gas in an exhaust line for an internal combustion engine, comprising:

temperature range shift means for shifting a temperature range of activation of said catalyst toward a higher side;

deoxidized condition detecting means for detecting a degree of oxidation of said catalyst; and control means for controlling said temperature range shift means to shift said temperature range of activation toward the higher side in response to said degree of oxidation becoming greater.

2. An exhaust gas purification system as defined in claim 1, wherein said deoxidized condition detecting means includes an oxygen sensor for detecting concentration of oxygen in an exhaust gas downstream from said catalyst which said concentration tending to become higher with an increase in degree of oxidation.

3. An exhaust gas purification system as defined in claim 1, wherein said temperature range shift means comprises an air supply system for supplying air to said exhaust line upstream from said catalyst.

4. An exhaust gas purification system as defined in claim 3, wherein said air supply system comprises an air line communicating said exhaust line to the atmosphere and an air pump disposed in said air line.

5. An exhaust gas purification system as defined in claim 4, wherein said air line communicates said exhaust line to the atmosphere through an intake line for the internal combustion engine.

6. An exhaust gas purification system as defined in claim 1, wherein said temperature range shift means interrupts fuel supply to at least one cylinder of said internal combustion engine.

* * * * *